(12) United States Patent
Tao et al.

(10) Patent No.: US 9,426,861 B2
(45) Date of Patent: Aug. 23, 2016

(54) DRIVER CIRCUIT BETWEEN ELECTROMAGNETIC BALLAST AND LED

(71) Applicant: KONINKLIJKE PHILIPS N.V., Eindhoven (NL)

(72) Inventors: Haimin Tao, Eindhoven (NL); Shrek Wang, Shanghai (CN); Jianhong Kong, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/409,105

(22) PCT Filed: Jun. 26, 2013

(86) PCT No.: PCT/IB2013/055236
§ 371 (c)(1),
(2) Date: Dec. 18, 2014

(87) PCT Pub. No.: WO2014/002021
PCT Pub. Date: Jan. 3, 2014

(65) Prior Publication Data
US 2015/0195886 A1    Jul. 9, 2015

Related U.S. Application Data

(60) Provisional application No. 61/664,817, filed on Jun. 27, 2012.

(51) Int. Cl.
*H05B 41/36* (2006.01)
*H05B 33/08* (2006.01)
*H05B 41/298* (2006.01)

(52) U.S. Cl.
CPC ........ *H05B 33/0887* (2013.01); *H05B 33/0809* (2013.01); *H05B 33/0884* (2013.01); *H05B 41/2981* (2013.01); *H05B 41/2983* (2013.01); *Y02B 20/341* (2013.01)

(58) Field of Classification Search
CPC .... H05B 33/00; H05B 33/02; H05B 33/0809; H05B 33/0875; H05B 33/0884; H05B 33/0887; H05B 33/0815; H05B 41/298; H05B 41/2981; H05B 41/2983
USPC ............. 315/291, 209 R, 224–226, 246–247, 315/276, 307–309, 312
See application file for complete search history.

(56) References Cited

U.S. PATENT DOCUMENTS

| 7,429,833 | B2* | 9/2008 | Peng | H05B 41/2981 315/224 |
| 8,502,454 | B2* | 8/2013 | Sadwick | H05B 33/0809 315/291 |
| 2004/0004446 | A1 | 1/2004 | Liu | |

(Continued)

FOREIGN PATENT DOCUMENTS

| WO | 2006102355 A2 | 9/2006 |
| WO | 2011155712 A2 | 12/2011 |

*Primary Examiner* — Douglas W Owens
*Assistant Examiner* — Borna Alaeddini

(57) ABSTRACT

To protect electromagnetic ballasts against damage, driver circuits for coupling the electromagnetic ballasts to light circuits comprising light emitting diodes are provided with rectifier bridges for exchanging first current signals with the electromagnetic ballasts and for providing second current signals to the light circuits, and with protection circuits for protecting the electromagnetic ballasts against parameters of the first current signals obtaining values larger than threshold values. The parameters may be direct-current components of the first current signals and may be average values of rectified versions of the first current signals/peak values of the first current signals. The rectifier bridges may comprise first diode elements. The protection circuits may comprise second diode elements serially coupled to the first diode elements. The protection circuit may comprise average value detectors/peak value detectors and may comprise switches for, in response to detection results, interrupting the second current signals.

11 Claims, 2 Drawing Sheets

(56) References Cited

U.S. PATENT DOCUMENTS

| | | | | |
|---|---|---|---|---|
| 2005/0269972 A1* | 12/2005 | Trestman | H05B 41/2855 | 315/294 |
| 2007/0228999 A1* | 10/2007 | Kit | F21K 9/17 | 315/291 |
| 2007/0267981 A1* | 11/2007 | Peng | H05B 41/28 | 315/291 |
| 2008/0290814 A1* | 11/2008 | Leong | F21K 9/00 | 315/294 |
| 2010/0033095 A1* | 2/2010 | Sadwick | H05B 33/0809 | 315/51 |

* cited by examiner

DRIVER CIRCUIT BETWEEN ELECTROMAGNETIC BALLAST AND LED

CROSS-REFERENCE TO PRIOR APPLICATIONS

This is the U.S. National Phase application under 35 §371 of International Application No. PCT/IB13/055236, filed on Jun. 26, 2013, which claims the benefit of U.S. Provisional Patent Application No. 61/664,817, filed on Jun. 27, 2012. These applications are hereby incorporated by reference herein.

FIELD OF THE INVENTION

The invention relates to a driver circuit for coupling an electromagnetic ballast to a light circuit comprising one or more light emitting diodes. The invention further relates to a device comprising the driver circuit and further comprising the electromagnetic ballast and/or the light circuit.

Examples of such a driver circuit are rectifier bridges. Examples of such a device are electromagnetic ballasts, lamps and parts thereof.

BACKGROUND OF THE INVENTION

When replacing gas-discharge lamps, such as fluorescent lamps, by light circuits comprising one or more light emitting diodes, sometimes the electromagnetic ballasts required for driving the gas-discharge lamps cannot be replaced or removed or should not be replaced or removed. In that case, the driver circuit possibly may cause damage to this electromagnetic ballast when the driver circuit drives the light circuit comprising one or more light emitting diodes.

SUMMARY OF THE INVENTION

It is an object of the invention to provide an improved driver circuit. It is a further object of the invention to provide an improved device.

According to a first aspect, a driver circuit for coupling an electromagnetic ballast to a light circuit comprising one or more light emitting diodes is provided, the driver circuit comprising
  a rectifier bridge with an input for exchanging a first current signal with the electromagnetic ballast and with an output for providing a second current signal to the light circuit, and
  a protection circuit for protecting the electromagnetic ballast against a parameter of the first current signal obtaining a value larger than a threshold value.

By providing the driver circuit, in addition to the rectifier circuit, with the protection circuit, the electromagnetic ballast is protected against a parameter of the first current signal obtaining a value larger than a threshold value.

An insight could be that a parameter of the first current signal that has obtained a value larger than a threshold value may cause damage to the electromagnetic ballast.

A basic idea could be that the driver circuit is to be provided with a protection circuit for protecting the electromagnetic ballast against a parameter of the first current signal obtaining a value larger than a threshold value.

A light circuit comprises one or more light emitting diodes of whatever kind and in whatever combination.

An embodiment of the driver circuit is defined by the parameter being a direct-current component of the first current signal. Too large a direct-current component or DC component in the first current signal may result in saturation and thus overheating of the electromagnetic ballast. This may result in damage to the electromagnetic ballast and its environment.

An embodiment of the driver circuit is defined by the rectifier bridge comprising four first diode elements, the protection circuit comprising four second diode elements, respective first diode elements being serially coupled to respective second diode elements. A rectifier circuit consisting of four times two or more serially coupled diode elements forms a good protection against one of the diode elements failing as a so-called short. A diode element that fails as a short has too low an impedance value in its blocking direction. As soon as one of the diode elements in a serial connection has too low an impedance value in its blocking direction, the other one of the diode elements in this serial connection will still exhibit its normal impedance behavior and will still block a reverse current. As a result, the combination of the rectifier bridge and the protection circuit will still have its rectifying function. The first and/or second current signal will then get a slightly asymmetrical shape due to the abnormal impedance behavior of the failing diode element, and as a result the DC component in this current signal will get a value slightly larger than zero, but this value is still small enough to avoid damage to the electromagnetic ballast.

A diode element comprises a diode or a zener diode or a transistor or a part thereof. In the case of two or more serially coupled diode elements, each one may comprise a diode or a zener diode or a transistor or a part thereof.

An embodiment of the driver circuit is defined by the parameter being an average value of a rectified version of the first current signal. Too large an average value of the rectified version of the first current signal may result in the electromagnetic ballast becoming too hot. This may result in damage to the electromagnetic ballast and its environment. The average value of a rectified first current signal may represent a root mean square value of this first current signal.

An embodiment of the driver circuit is defined by the protection circuit comprising a detector for detecting the average value of the rectified version of the first current signal or an average value of the second current signal, and comprising a switch for, in response to a detection result, interrupting the second current signal. Detecting the average value of the second current signal is an alternative to detecting the average value of the rectified version of the first current signal.

An embodiment of the driver circuit is defined by the parameter being a peak value of the first current signal. Too large a peak value of the first current signal may result in the electromagnetic ballast becoming too hot. This may result in damage to the electromagnetic ballast and its environment.

An embodiment of the driver circuit is defined by the protection circuit comprising a detector for detecting the peak value of the first current signal or a peak value of the second current signal, and comprising a switch for, in response to a detection result, interrupting the second current signal. Too large a peak value of the first and/or the second current signal may result from a diode element failing as a so-called open. A diode element that fails as an open has an excessively large impedance value in its conducting direction. Detecting the peak value of the second current signal is an alternative to detecting the peak value of the first current signal.

An embodiment of the driver circuit is defined by the detector comprising a serial connection of a resistor, a diode and a capacitor, the detector further comprising a comparator for comparing an amplitude of a voltage signal present across the capacitor with a threshold voltage value and for, in response to a comparison result, controlling the switch. This is a simple, low-cost and robust peak value detector.

An embodiment of the driver circuit is defined by a combination of a resistance value of the resistor and a capacitance value of the capacitor being arranged to determine a reaction time of the detector. Preferably, the reaction time should be below a predefined time-interval such as for example one second or two seconds or five seconds or ten seconds etc.

An embodiment of the driver circuit is defined by the parameter comprising a first parameter, a second parameter and a third parameter, the first parameter being a direct-current component of the first current signal, the second parameter being an average value of a rectified version of the first current signal, and the third parameter being a peak value of the first current signal.

An embodiment of the driver circuit is defined by the rectifier bridge comprising four first diode elements, the protection circuit comprising four second diode elements, respective first diode elements being serially coupled to respective second diode elements, the protection circuit further comprising one or more detectors for detecting the average value of the rectified version of the first current signal or an average value of the second current signal and for detecting the peak value of the first current signal or a peak value of the second current signal, and further comprising a switch for, in response to one or more detection results, interrupting the second current signal.

An embodiment of the driver circuit is defined by the parameter being a root mean square value of the first current signal. Too large a root mean square value of the first current signal may result in saturation and thus overheating of the electromagnetic ballast. This may result in damage to the electromagnetic ballast and its environment. The protection circuit may then be provided with a detector for detecting the root mean square value of the first current signal or the root mean square value of the second current signal, and with a switch for, in response to a detection result, interrupting the second current signal.

According to a second aspect, a device is provided comprising the driver circuit and further comprising the electromagnetic ballast and/or the light circuit.

The problem of providing an improved driver circuit has been solved. A further advantage could be that the driver circuit is simple, low-cost and robust.

These and other aspects of the invention will be apparent from and elucidated with reference to the embodiments described hereinafter.

DETAILED DESCRIPTION OF EMBODIMENTS

Figure 1:
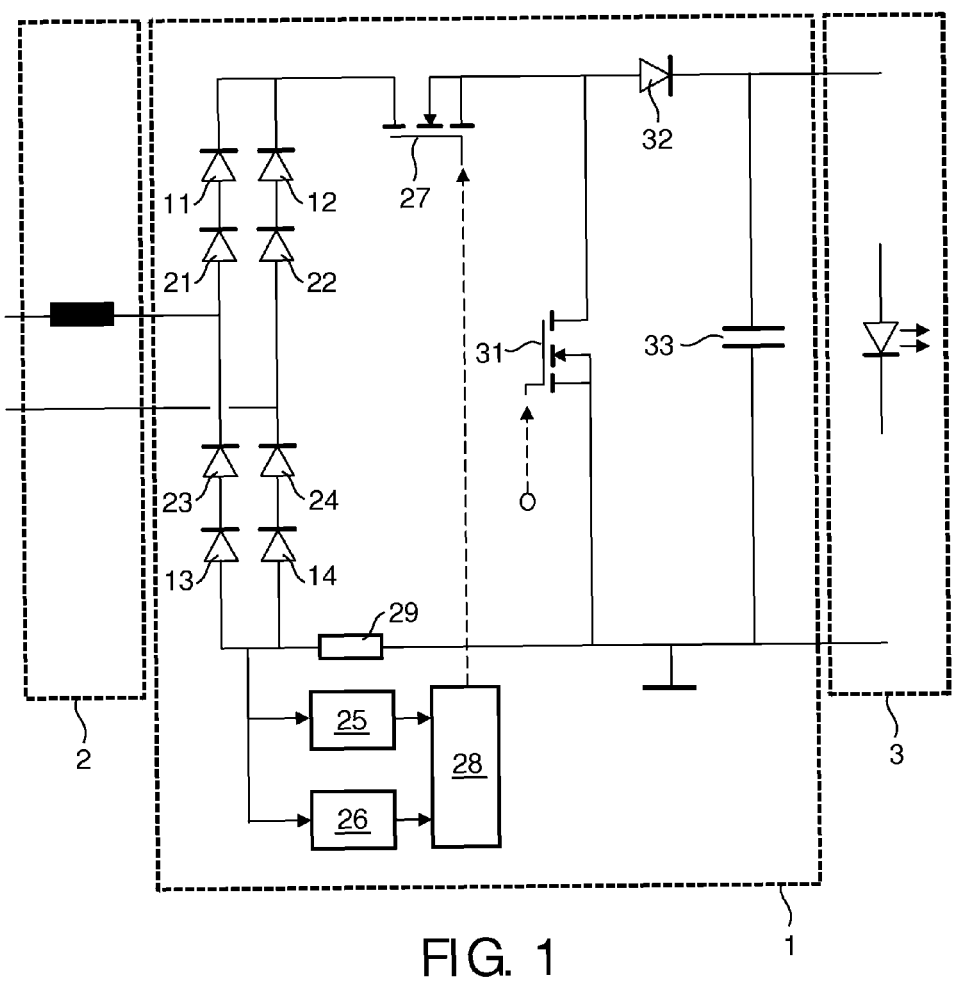
FIG. 1 shows an embodiment of a driver circuit.

In FIG. 1, an embodiment of a driver circuit 1 is shown. The driver circuit 1 is arranged for coupling an electromagnetic ballast 2, such as a passive ballast that comprises for example a serial inductor, to a light circuit 3 that comprises one or more light emitting diodes. The driver circuit 1 comprises a rectifier bridge 11-14 with an input for exchanging a first current signal with the electromagnetic ballast 2 and with an output for providing a second current signal to the light circuit 3. The driver circuit 1 further comprises a protection circuit 21-24, 25-27 for protecting the electromagnetic ballast 2 against a parameter of the first current signal obtaining a value larger than a threshold value.

Therefore, a first input terminal of the driver circuit 1 is coupled to a first output terminal of the electromagnetic ballast 2, which first output terminal is for example coupled to the serial inductor. The first input terminal of the driver circuit 1 is coupled to (an anode of) a first serial connection of two diode elements 21 and 11, and to (a cathode of) a third serial connection of two diode elements 23 and 13. A second input terminal of the driver circuit 1 is coupled to a second output terminal of the electromagnetic ballast 2. The second input terminal of the driver circuit 1 is coupled to (an anode of) a second serial connection of two diode elements 22 and 12, and to (a cathode of) a fourth serial connection of two diode elements 24 and 14.

The diode elements 11 and 12 (their cathodes) are coupled to each other and to a first main contact of a switch 27, here a first main electrode of a transistor. The diode elements 13 and 14 (their anodes) are coupled to each other and to a first side of a resistor 29 and to inputs of an average value detector 25 and a peak value detector 26. Another side of the resistor 29 is coupled to ground. Outputs of the detectors 25 and 26 are coupled to inputs of a combining circuit 28 such as an OR gate, that provides a control signal to a control contact of the switch 27, here a control electrode of the transistor. A second main contact of the switch 27, here a second main electrode of the transistor, is coupled to an anode of a diode 32 and to a first main contact of a further switch 31, here a first main electrode of a further transistor. A second main contact of the further switch 31, here a second main electrode of the further transistor, is coupled to ground. A cathode of the diode 32 forms a first output terminal of the driver circuit 1 and is coupled to one side of a capacitor 33 and to a first input terminal of the light circuit 3. Another side of the capacitor 33 forms a second output terminal of the driver circuit 1 and is coupled to ground and to a second input terminal of the light circuit 3.

In a first situation, where protection is required against a parameter in the form of a direct-current component of the first current signal obtaining a value larger than a threshold value, in the driver circuit 1 the diode elements 11-14 and 21-24 are present, and all other elements 25-29 could be left out. In case one of the diode elements 11-14 has too low an impedance value in its blocking direction (has become a so-called short), the other one of the diode elements 21-24 in the same serial connection will still exhibit its normal impedance behavior, and as a result the combination of the rectifier bridge 11-14 and the protection circuit 21-24 will still have its rectifying function. The first and/or second current signal will then get a slightly asymmetrical shape, and as a result the direct current component or DC component in this current signal will get a value slightly larger than zero, but this value is still small enough to avoid damage to the electromagnetic ballast 2.

The DC component in the current signal will be, for example, one hundred times smaller in case one of the eight diode elements has become a short, as compared to when one of the four diode elements has become a short in a conventional rectifier circuit.

In a second situation, where protection is required against a parameter in the form of an average value of a rectified version of the first current signal obtaining a value larger than a threshold value, in the driver circuit 1 the diode elements 11-14 (or 21-24) are present, and the average value detector 25, the switch 27 and for example the resistor 29 are present. Across the resistor 29 a voltage signal is present that allows the average value detector 25 to perform a detection, but it will be clear to a person skilled in the art that there are many alternatives to such a resistor. So, in this case, the protection circuit 25, 27 comprises the detector 25 for detecting the average value of the second current signal, which detection is an alternative to the detection of an average value of a rectified version of the first current signal, and comprises the switch 27 for, in response to a detection result, interrupting the second current signal.

In a third situation, where protection is required against a parameter in the form of a peak value of the first current signal obtaining a value larger than a threshold value, in the driver circuit 1 the diode elements 11-14 (or 21-24) are present, and the peak value detector 26, the switch 27 and for example the resistor 29 are present. Across the resistor 29 a voltage signal is present that allows the peak value detector 26 to perform a detection, but it will be clear to a person skilled in the art that there are many alternatives to such a resistor. So, in this case, the protection circuit 26, 27 comprises the detector 26 for detecting the peak value of the second current signal, which detection is an alternative to the detection of the peak value of the first current signal, and comprises the switch 27 for, in response to a detection result, interrupting the second current signal.

The peak value of the current signal will become excessively high in case one of the diode elements has too high an impedance value in its conducting direction (has become a so-called open).

The further switch 31 allows an amount of power as supplied to the light circuit 3 to be controlled. Therefore, in a non-conducting mode of the further switch 31, the second current signal flows via the diode 32 to the light circuit 3 and is further used for charging the capacitor 33. In a conducting mode of the further switch 31, the second current signal flows through this further switch 31 to ground, and the light circuit 3 gets its power only from the charged capacitor 33. The diode 32 prevents this capacitor 33 from being discharged via the conducting further switch 31. The control of such a further switch 31 will be clear to a person skilled in the art. Alternatively, some or all of the elements 31-33 may form part of the light circuit 3.

As an alternative to detecting the average value of the rectified version of the first current signal or the average value of the second current signal, a root mean square value of the first or second current signal could be detected. But root mean square detectors are (at the moment) relatively complex and relatively expensive. Average value detectors such as RC filters are relatively simple and relatively low-cost.

Figure 2:
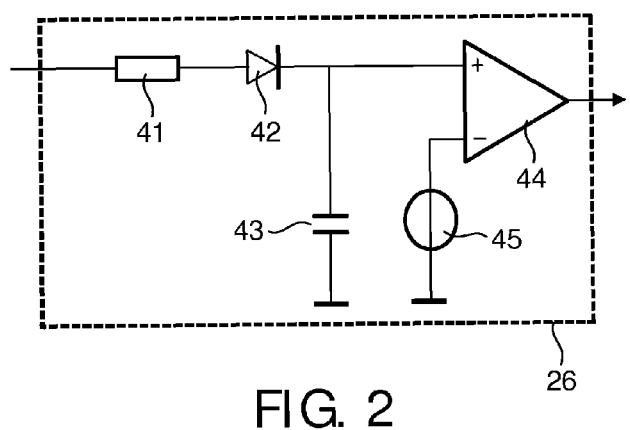
FIG. 2 shows an embodiment of a peak value detector.

In FIG. 2, an embodiment of a peak value detector 26 is shown. The detector 26 comprises a serial connection of a resistor 41, a diode 42 and a capacitor 43, and further comprises a comparator 44 for comparing an amplitude of a voltage signal present across the capacitor 43 with a threshold voltage value generated by a source 45, and for, in response to a comparison result, controlling the switch 27. Preferably, a combination of a resistance value of the resistor 41 and a capacitance value of the capacitor 43 is arranged to define a reaction time of the detector 26.

A diode element comprises a diode or a zener diode or a transistor or a part thereof. Each one of two or more serially coupled diode elements may comprise a diode or a zener diode or a transistor or a part thereof. Each switch 27, 31 may be a transistor or any other kind of switch. The detectors 25 and 26 may be combined, possibly with the combining circuit 28. In case only one detector 25, 26 is used, the combining circuit 28 will not be necessary. Many alternatives to the combining circuit and many embodiments for the detectors 25 and 26 will be clear to a person skilled in the art.

Figure 3:
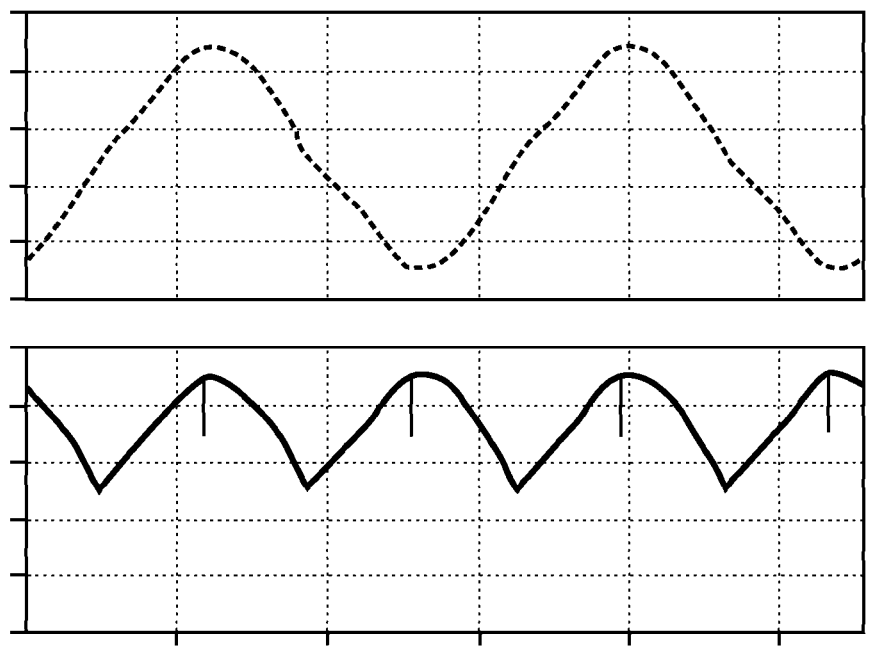
FIG. 3 shows waveforms in a normal situation.

In FIG. 3, waveforms are shown for a normal situation. Upper graph: First current signal. Lower graph: Second current signal. Current from −1 to 1 A plotted vertically. Time from 0 to 33.3 msec. plotted horizontally.

Figure 4:
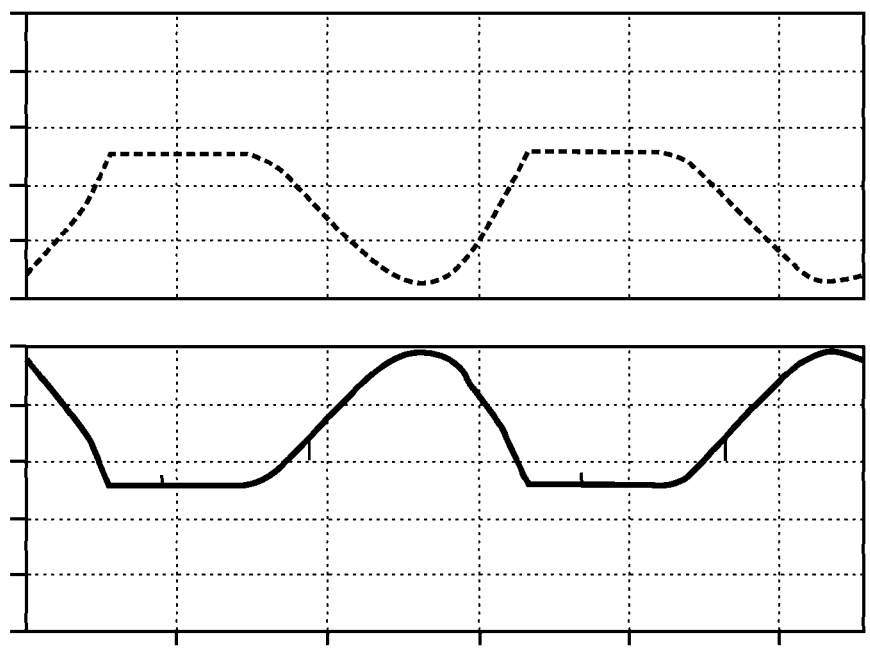
FIG. 4 shows waveforms in a faulty situation.

In FIG. 4, waveforms are shown for a faulty situation (one diode element has become an open-the peak value detector 26 controls the switch 27 to interrupt the second current signal). Upper graph: First current signal. Lower graph: Second current signal. Current from −1 to 1 A plotted vertically. Time from 0 to 33.3 msec. plotted horizontally.

Summarizing, to protect electromagnetic ballasts 2 against damage, driver circuits 1 for coupling the electromagnetic ballasts 2 to light circuits 3 comprising light emitting diodes are provided with rectifier bridges 11-14 for exchanging first current signals with the electromagnetic ballasts 2 and for providing second current signals to the light circuits 3, and with protection circuits 21-24, 25-27 for protecting the electromagnetic ballasts 3 against parameters of the first current signals obtaining values larger than threshold values. The parameters may be direct-current components of the first current signals and may be average values of rectified versions of the first current signals/peak values of the first current signals. The rectifier bridges 11-14 may comprise first diode elements. The protection circuits 21-24, 25-27 may comprise second diode elements serially coupled to the first diode elements. The protection circuit may comprise average value detectors 25/peak value detectors 26, and may comprise switches 27 for, in response to detection results, interrupting the second current signals.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device, comprising:
a rectifier bridge with an input for exchanging a first current signal with an electromagnetic ballast and with an output for providing a second current signal to a light circuit comprising one or more light emitting diodes, the rectifier bridge comprising four first diode elements, and
a protection circuit for protecting the electromagnetic ballast against one or more parameters of the first current signal obtaining a value larger than a threshold value,
wherein the one or more parameters comprise a direct-current component of the first current signal, the protection circuit comprising four second diode elements,
wherein respective first diode elements are serially coupled to respective second diode elements.

2. The device of claim 1, the one or more parameters comprising a first parameter, a second parameter and a third parameter, the first parameter being a direct-current component of the first current signal, the second parameter being an average value of a rectified version of the first current signal, and the third parameter being a peak value of the first current signal.

3. The device of claim 2, the rectifier bridge comprising four first diode elements, the protection circuit comprising four second diode elements, respective first diode elements being serially coupled to respective second diode elements, the protection circuit further comprising one or more detectors for detecting the average value of the rectified version of the first current signal or an average value of the second current signal and for detecting the peak value of the first current signal or a peak value of the second current signal and further comprising a switch for, in response to one or more detection results, interrupting the second current signal.

4. The device of claim 1, the one or more parameters comprising a root mean square value of the first current signal.

5. The device of claim 1, further comprising the electromagnetic ballast.

6. The device of claim 1, further comprising the light circuit.

7. The device of claim 1, further comprising the electromagnetic ballast and the light circuit.

8. A device, comprising:
a rectifier bridge with an input for exchanging a first current signal with an electromagnetic ballast and with an output for providing a second current signal to a light circuit comprising one or more light emitting diodes, and
a protection circuit for protecting the electromagnetic ballast against one or more parameters of the first current signal obtaining a value larger than a threshold value, the one or more parameters comprising an average value of a rectified version of the first current signal, the protection circuit comprising a detector for detecting the average value of the rectified version of the first current signal or an average value of the second current signal, and comprising a switch for, in response to a detection result, interrupting the second current signal.

9. A device comprising:
a rectifier bridge with an input for exchanging a first current signal with an electromagnetic ballast and with an output for providing a second current signal to a light circuit comprising one or more light emitting diodes, and
a protection circuit for protecting the electromagnetic ballast against one or more parameters of the first current signal obtaining a value larger than a threshold value, the one or more parameters comprising a peak value of the first current signal, wherein the protection circuit comprises a detector for detecting the peak value of the first current signal or a peak value of the second current signal, and comprising a switch for, in response to a detection result, interrupting the second current signal.

10. The device of claim 9, the detector comprising a serial connection of a resistor, a diode and a capacitor, the detector further comprising a comparator for comparing an amplitude of a voltage signal present across the capacitor with a threshold voltage value and for, in response to a comparison result, controlling the switch.

11. The device of claim 10, a combination of a resistance value of the resistor and a capacitance value of the capacitor being such as to determine a reaction time of the detector.

* * * * *